(12) United States Patent
Woodworth et al.

(10) Patent No.: US 11,637,808 B2
(45) Date of Patent: Apr. 25, 2023

(54) GENERATION AND USE OF MICRO-POOLS TO ASSIGN AN IP ADDRESS TO A REQUESTING COMPUTING DEVICE

(71) Applicant: CenturyLink Intellectual Property LLC, Broomfield, CO (US)

(72) Inventors: John R. B. Woodworth, Amissville, VA (US); Dean Ballew, Sterling, VA (US); James C. Anders, Lee's Summit, MO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/659,564

(22) Filed: Apr. 18, 2022

(65) Prior Publication Data

US 2022/0345445 A1 Oct. 27, 2022

Related U.S. Application Data

(60) Provisional application No. 63/178,297, filed on Apr. 22, 2021.

(51) Int. Cl.
*H04L 61/5061* (2022.01)
*H04L 61/5007* (2022.01)
*H04L 43/065* (2022.01)
*H04L 67/60* (2022.01)

(52) U.S. Cl.
CPC ........ *H04L 61/5061* (2022.05); *H04L 43/065* (2013.01); *H04L 61/5007* (2022.05); *H04L 67/60* (2022.05)

(58) Field of Classification Search
None
See application file for complete search history.

(56) References Cited

U.S. PATENT DOCUMENTS

| | | | | |
|---|---|---|---|---|
| 6,952,735 | B1* | 10/2005 | Aune | H04W 8/26 370/338 |
| 9,813,374 | B1* | 11/2017 | Magerramov | H04L 61/5007 |
| 2007/0002833 | A1* | 1/2007 | Bajic | H04L 61/5014 370/352 |
| 2008/0285496 | A1* | 11/2008 | Fuchs | H04L 67/06 370/345 |
| 2009/0190587 | A1* | 7/2009 | Zhao | H04L 12/18 370/390 |
| 2009/0285126 | A1* | 11/2009 | Lu | H04W 84/20 370/255 |
| 2011/0238793 | A1* | 9/2011 | Bedare | H04L 61/5061 709/224 |
| 2011/0282998 | A1* | 11/2011 | Johnsson | H04L 61/5061 709/226 |
| 2016/0248732 | A1* | 8/2016 | Kolesnik | H04L 61/5061 |
| 2018/0069771 | A1* | 3/2018 | Dade | H04L 41/0604 |
| 2019/0068546 | A1* | 2/2019 | Szamonek | H04L 61/5061 |
| 2019/0386884 | A1* | 12/2019 | Qi | H04L 47/12 |
| 2020/0186494 | A1* | 6/2020 | X | H04L 61/5014 |
| 2021/0119965 | A1* | 4/2021 | Meng | H04L 61/5053 |
| 2021/0288917 | A1* | 9/2021 | Gillon | H04L 45/74 |

* cited by examiner

*Primary Examiner* — Joshua Joo

(57) ABSTRACT

The present application describes the generation and use of micro-pools that are assigned to various DHCP servers by an agent. In examples, each micro-pool includes a set number of IP addresses. The agent tracks which DHCP servers are assigned which micro-pools. As the IP addresses of a micro-pool are assigned to requesting computing devices, the agent may subsequently assign an additional micro-pool to a particular DHCP server.

13 Claims, 12 Drawing Sheets

GENERATION AND USE OF MICRO-POOLS TO ASSIGN AN IP ADDRESS TO A REQUESTING COMPUTING DEVICE

CROSS REFERENCE TO RELATED APPLICATIONS

This application claims the benefit of U.S. Provisional Application No. 63/178,297 filed Apr. 22, 2021, entitled "Generation and Use of Micro-Pools to Assign an IP address to a requesting computing device," which is incorporated herein by reference in its entirety.

BACKGROUND

DHCP servers dynamically issue internet protocol (IP) addresses to various requesting computing devices. However, a DHCP server can quickly become overburdened or unexpectedly fail. In either case, services provided by the DHCP server may be disrupted and cause internet connectivity issues with computing devices to which the DHCP server has provided, or is configured to provide, IP addresses.

SUMMARY

The present application describes systems and methods for enabling DHCP servers in a DHCP server cluster to assign internet protocol (IP) addresses to requesting computing devices and/or to renew a lease on already assigned IP addresses. However, unlike typical solutions in which a specified number (e.g., a first half) of the IP addresses in a general pool of IP addresses is available or is otherwise assigned to a first DHCP server in a DHCP server cluster, and another specified number (e.g., a second half) of the IP addresses in the general pool of IP addresses is available or is otherwise assigned to a second DHCP server in the DHCP server cluster, the present application describes use of an intelligent agent that assigns each DHCP server in the DHCP server cluster a micro-pool of IP addresses.

In an example, each micro-pool has a set number of different IP addresses that are part of a general pool of IP addresses available to each DHCP server in a DHCP server cluster. When a micro-pool is assigned to a particular DHCP server, the DHCP server assigns one of the IP addresses in the micro-pool to a requesting computing device. In response to a DHCP server assigns some, or all, of the IP addresses in its micro-pool to requesting computing devices, the intelligent agent may assign another micro-pool of IP addresses to that DHCP server. The DHCP server can subsequently assign the IP addresses in the additional micro-pool to other requesting computing devices.

Accordingly, aspects of the present disclosure describe a method for assigning IP addresses to one or more servers in a server cluster. The method includes generating a first micro-pool and a second micro-pool from a pool of IP addresses. In an example, the first micro-pool has a first set of IP addresses from the pool of IP addresses and the second micro-pool has a second set of IP addresses from the pool of IP addresses. The first micro-pool is assigned to a first server and the second micro-pool is assigned to a second server. The first server and the second server may be DHCP servers. A request from a computing device is monitored. In an example, the request includes a request for an IP address. Additionally, the request causes the first server to respond with a first IP address from the first set of IP addresses in the first micro-pool and also causes the second server to respond with a second IP address from the second set of IP addresses in the second micro-pool. A status of one of the first micro-pool or the second micro-pool is monitored based, at least in part, on the computing device selecting either the first IP address or the second IP address.

Also described is a system that includes a processor and a memory communicatively coupled to the processor. The memory stores instructions that, when executed by the processor, perform operations. These operations include assigning a first micro-pool to a first server and assigning a second micro-pool to a second server. The first server and the second server may be DHCP servers. In an example, the first micro-pool has a first set of IP addresses from a pool of IP addresses and the second micro-pool has a second set of IP addresses from the pool of IP addresses. A status of the first micro-pool and the second micro-pool is monitored. The first server is assigned another micro-pool based, at least in part, on the monitored status of the first micro-pool.

The present disclosure also describes a method for monitoring the status of one or more servers in a server cluster that assign IP addresses to various requesting computing devices. In an example, the method includes monitoring a status of a first server and a second server. The first server and the second server may be DHCP servers. The first server is assigned a first micro-pool and the second server is assigned a second micro-pool. The first micro-pool has a first set of IP addresses from a pool of IP addresses and the second micro-pool has a second set of IP addresses from the pool of IP addresses. Based on an overload condition associated with the first server being detected, an agent associated with the first server and the second server causes the first server to delay responding to requests received from a computing device. This delay causes the second server to provide an IP address from the second set of IP addresses to the computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
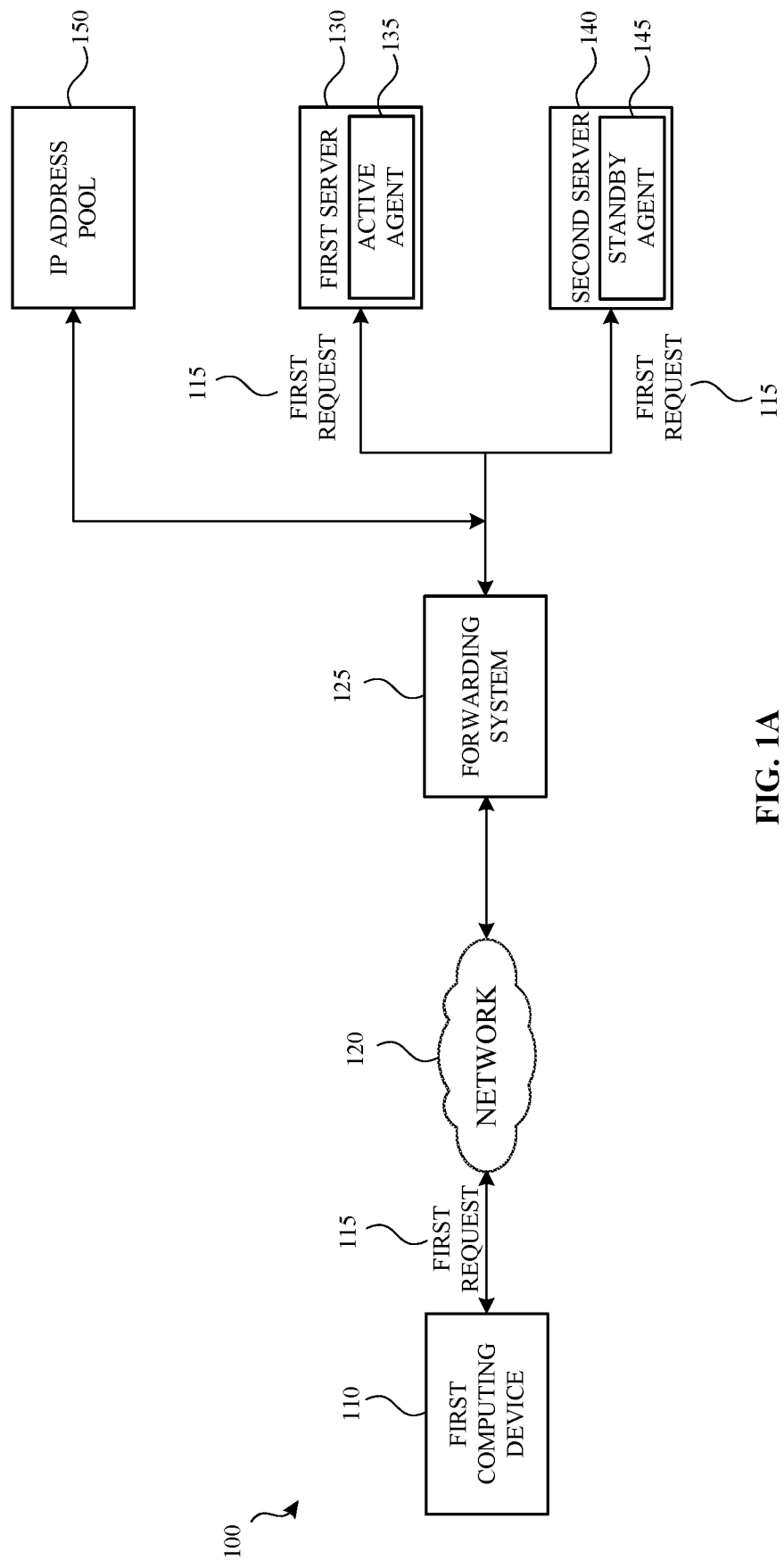
FIG. 1A illustrates an example system in which a computing device submits an IP address request to servers in a server cluster according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In a local area network (LAN), when a computing device does not have an IP address, the computing device typically requests an IP address from a DHCP server. For example, when a computing device boots up or connects to a particular network for the first time, the computing device broadcasts an IP address request via the network. The IP address request is typically received by a DHCP server. In response to receiving the request, the DHCP server generates an offer that includes an available IP address. The offer is then transmitted to the requesting computing device and the computing device can either accept or reject the offer.

The request for the IP address may be received by a number of different DHCP servers. For example, two different DHCP servers may receive the request and each DHCP server may respond with a different offer (e.g., each DHCP server may respond with a different IP address). When the computing device receives the offers, the computing device selects one of the offers (e.g., the offer that the computing device received first). The offer that was not accepted is withdrawn by the DHCP server that submitted it.

In a wide area network (WAN), similar events occur. For example, in a WAN, when a computing device broadcasts a request for an IP address, the broadcast is intercepted by an access provider. The access provider forwards the broadcast to an IP address associated with a DHCP server. When the DHCP server receives the broadcast, the DHCP server may respond with an offer. In an example, the offer may be in the form of a broadcast or the offer may be sent directly to the computing device.

In some examples, the access provider may have access to two or more DHCP servers. In such an example, the access provider converts the broadcast provided by the computing device to multiple requests and sends each DHCP server in the server cluster the request. In typical configurations, both DHCP servers share the same pool of IP addresses. As such a first DHCP server may have access to a first block of IP addresses in the pool of IP addresses and a second DHCP server may have access to a second block of IP addresses in the pool of IP addresses. For example, a pool of IP addresses may have a total of two-hundred and fifty-six available IP addresses. In this example, the first DHCP server may have access to IP addresses 0-127 while the second DHCP server may have access to IP addresses 128-255.

When the request is received by the first DHCP server and the second DHCP server, each DHCP server analyzes the request and determines whether or not it will respond to the request. For example, based on a media access control (MAC) address associated with the request, the first DHCP server may determine that it should respond to the request and the second DHCP server may determine that it should not respond to the request. Accordingly, the first DHCP server will send an offer, including an IP address from its block of available IP addresses, to the requesting computing device. Meanwhile, the second DHCP server will not submit an offer to the requesting computing device. When the offer from the first DHCP server is received, the computing device may accept the offer and subsequently be provided access to the network through the typical DHCP discover, offer, request, acknowledge (DORA) process.

IP addresses are typically leased for a period of time (e.g., twenty-four hours). As such, the lease on a particular IP address needs to be periodically renewed. The renewal of an IP address lease is typically handled by the DHCP server that originally issued the IP address. Continuing with the example above, when the computing device requests a renewal of the lease of its IP address, the renewal request is provided to the first DHCP server.

However, problems with the initial assignment of IP addresses and the renewal of those IP addresses arise when one or more DHCP servers are inoperable. For example, if the first DHCP server goes down but is supposed to respond to a particular request and/or a particular renewal request, the second DHCP server will only respond to the request after a particular amount of time has passed. For example, in the case of a renewal request, the second DHCP server may provide the computing device with the IP address it was originally assigned from the first DHCP server. Likewise, when a request for an IP address is received, the second DHCP server may issue an IP address out of the block of IP addresses controlled by the first DHCP server.

When the first DHCP server comes back online, a reconciliation process occurs between the first DHCP server and the second DHCP server. During the reconciliation process, the first DHCP server may check an IP address lease database that is shared with the second DHCP server. The lease database has the most up to date information about available IP addresses, lease periods etc. Additionally, the first DHCP server may communicate with the second DHCP server to ensure that the first DHCP server has record of all IP address renewals and/or issuances that occurred while the first DHCP was inoperable. This helps ensure that the same IP address is not issued to two or more different computing devices. During this reconciliation process, the first DHCP server will neither issue new IP addresses to requesting computing devices nor renew a lease on an IP address.

The example scenario described above may severely impact various computing devices that are seeking to access the Internet. Additionally, the example scenario gets more complicated and complex as additional DHCP servers are added to a DHCP server cluster.

In order to resolve the above, the present application describes an agent that generates and assigns micro-pools to various DHCP servers in a DHCP server cluster. The agent is associated with one of the DHCP servers in the DHCP server cluster. Additionally, each of the other DHCP servers in the DHCP cluster have a standby agent. One of the standby agents associated with one of the other DHCP servers in the cluster will be activated if the DHCP server associated with the active agent crashes, goes down or is otherwise offline/unavailable.

Each micro-pool assigned to each DHCP server in the DHCP server cluster includes a set of IP addresses selected from a pool of available IP addresses. As each DHCP server in the cluster receives a request from a computing device, each DHCP server may offer one of the IP addresses in its micro-pool. When a threshold number of IP addresses from a particular micro-pool have been assigned to various computing devices by a particular DHCP server, the DHCP server may request or otherwise receive another micro-pool with additional IP addresses.

In an example, the size of the micro-pool is relatively small when compared to the pool of available IP addresses. In examples, each micro-pool may comprise less than 0.1%, less than 1%, less than 2%, less than 5%, less than 10% of the total pool of IP addresses available to a particular DHCP server cluster. For example, each micro-pool may include four different IP addresses (although this number may be configurable or otherwise changed). Since the size of the micro-pool is relatively small, any negative impact from a DHCP server going offline is minimized since any number of micro-pools can be split across any number of servers. Additionally, the active agent can revoke micro-pools and/or IP addresses from one DHCP server and assign the micro-pool and/or an IP address to a different DHCP server.

Each of the DHCP servers in the DHCP server cluster can respond to the request for an IP address with an offer out of its own micro-pool. As a result, a filtering operation that would typically limit the number of servers that respond to the request is not required or needed.

The active agent is also configured to provide various load balancing operations. For example, the active agent can limit, mute and/or delay a particular DHCP server response to the request for an IP address in order to control load balancing across the various DHCP servers.

These and other examples will be shown and described with respect to FIG. 1A-FIG. 5.

FIG. 1A illustrates an example system 100 in which a computing device 110 submits an IP address request to various servers in a server cluster according to an example. Each of the servers shown and described with respect to FIG. 1A-FIG. 2B may be DHCP servers. In an example, the system 100 is part of or otherwise integrated with a wide area network (WAN). Although a WAN is specifically mentioned, the methods and systems described herein may be part of or otherwise integrated with a local area network (LAN).

As shown in FIG. 1A, the first computing device 110 may initiate a discovery process upon accessing a network 120. As part of the discovery process, the first computing device 110 may generate a first request 115. The first request 115 may be a request for an IP address.

The first request 115 is transmitted, via the network 120 to a forwarding system 125. The forwarding system 125 may be associated with or otherwise provided by a network service provider. Upon receiving the first request 115, the forwarding system 125 may convert the first request 115 from a first format to a second format. For example, the first request 115 may be converted to a request format (e.g., a conversion of the request into multiple different requests) that may be provided to multiple servers. The forwarding system 125 forwards the first request 115 to a first server 130 and a second server 140.

The first server 130 and the second server 140 may have access to IP addresses that are stored in or are otherwise associated with an IP address pool 150. Additionally, the first server 130 may have or otherwise be associated with an active agent 135 while the second server 140 has or is otherwise associated with a standby agent 145.

A determination of which agent is an active agent and which agent is the standby agent may be based on a negotiation process between the first server 130 and the second server 140. For example, the server with the highest MAC address may be elected to have the active agent. In another example, the agent hosted by the first server 130 may be the active agent for a first predetermined amount of time and then the agent hosted by the second server 140 may be the active agent for a second predetermined amount of time.

Although two servers are shown, the system 100 may include any number of servers and associated agents. In an example, some servers in the cluster may have an agent while others do not have an agent. In another example, all servers in the server cluster may have associated agents.

Additionally, although the first server 130 is shown as having the active agent 135 and the second server 140 has the standby agent 145, this may be reversed. That is, the agent associated with the second server 140 may have be the active agent and the agent associated with the first server 130 may be the standby agent. In an example, the active agent 135 shares information with the standby agent 145 which enables the standby agent 145 to move to an active agent role should the first server 130 crash or otherwise become inoperable. Although the active agent 135 and the standby agent 145 are shown as being integrated with the first server 130 and the second server 140 respectively, the active agent 135 and/or the standby agent 145 may be separate and distinct computing devices and/or systems from the first server 130 and/or the second server 140 but be communicatively coupled to each server.

Prior to receiving the first request 115 (e.g., during an initialization process and/or as part of a negotiation process), or in response to receiving the first request 115, the active agent 135 is configured to generate various micro-pools. A micro-pool is assigned to the first server 130 and the second server 140. For example and referring to FIG. 1B, the active agent 135 accesses the IP addresses in the IP address pool 150, generates a number of different micro-pools, and assigns a micro-pool to each server.

Figure 1B:
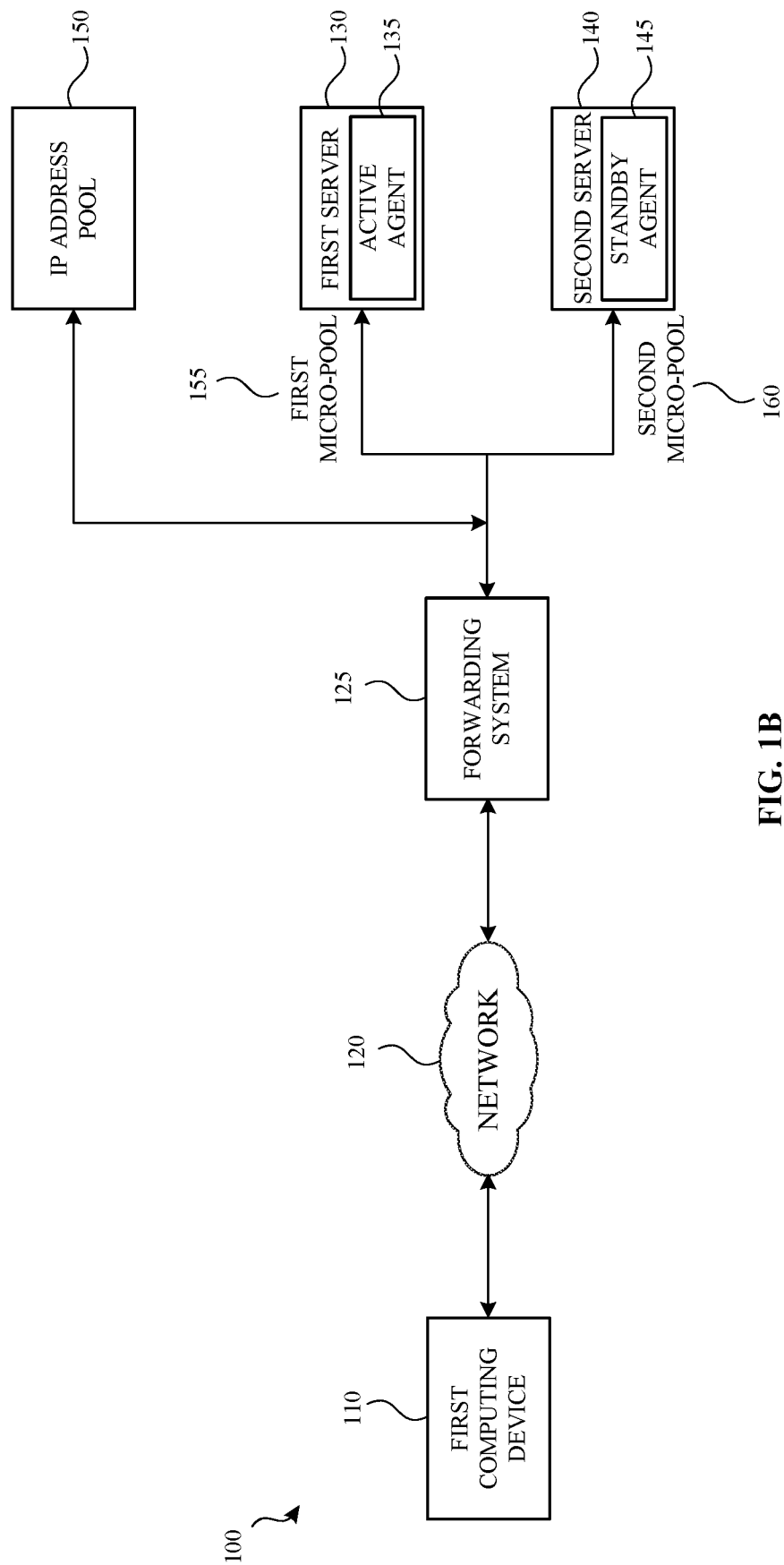
FIG. 1B illustrates the example system of FIG. 1A in which an agent assigns a micro-pool of IP addresses to each server in the server cluster according to an example.

As shown in FIG. 1B, the active agent 135 assigns a first micro-pool 155 to the first server 130 and assigns a second micro-pool 160 to the second server 140. The first micro-pool 155 includes a first set of IP addresses from the IP address pool 150 and the second micro-pool 160 includes a second set of IP address from the IP address pool 150.

The IP address pool 150 may have a set number of available IP addresses. For example, the IP address pool 150 has a block of two-hundred and fifty-six available IP addresses. Accordingly, the active agent 135 may generate sixty-four different micro-pools with each micro-pool having four IP addresses from the IP address pool 150.

Figure 3:
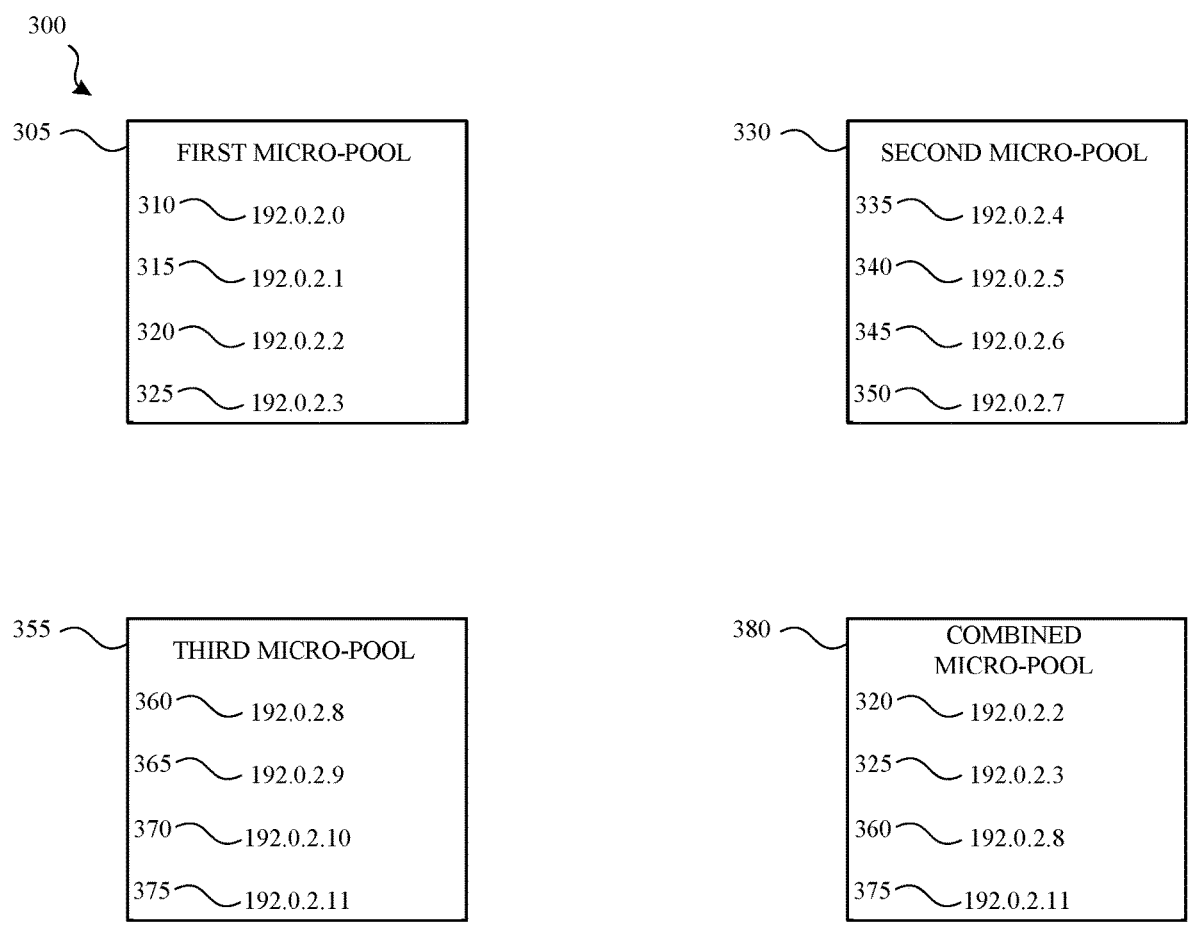
FIG. 3 illustrates various micro-pools according to an example.

FIG. 3 illustrates four example micro-pools—a first micro-pool 305, a second micro-pool 330, a third micro-pool 355 and a combined micro-pool 380. The first micro-pool 305 may be similar to the first micro-pool 155 (FIG. 1B) and the second micro-pool 330 may be similar to the second micro-pool 160 (FIG. 1B). Likewise, the third micro-pool 355 may be similar to a third micro-pool 187 shown and described with respect to FIG. 1F.

In this example, the first micro-pool 305 has four different IP addresses—192.0.2.0 (310), 192.0.2.1 (315), 192.0.2.2 (320) and 192.0.2.3 (325). Likewise, the second micro-pool 330 has four different IP addresses—192.0.2.4 (335), 192.0.2.5 (340), 192.0.2.6 (345) and 192.0.2.7 (350). Although the IP addresses in each of the first micro-pool 305 and the second micro-pool 330 are shown as being sequential, this is not required. A micro-pool may include sequential or non-sequential IP addresses. Additionally, although each micro-pool is shown and described has having four IP addresses, the number of IP addresses in a micro-pool may be adjustable and/or configurable. For example, a micro-pool may have two IP addresses, four IP addresses, eight IP addresses, sixteen IP addresses, etc.

Figure 1C:
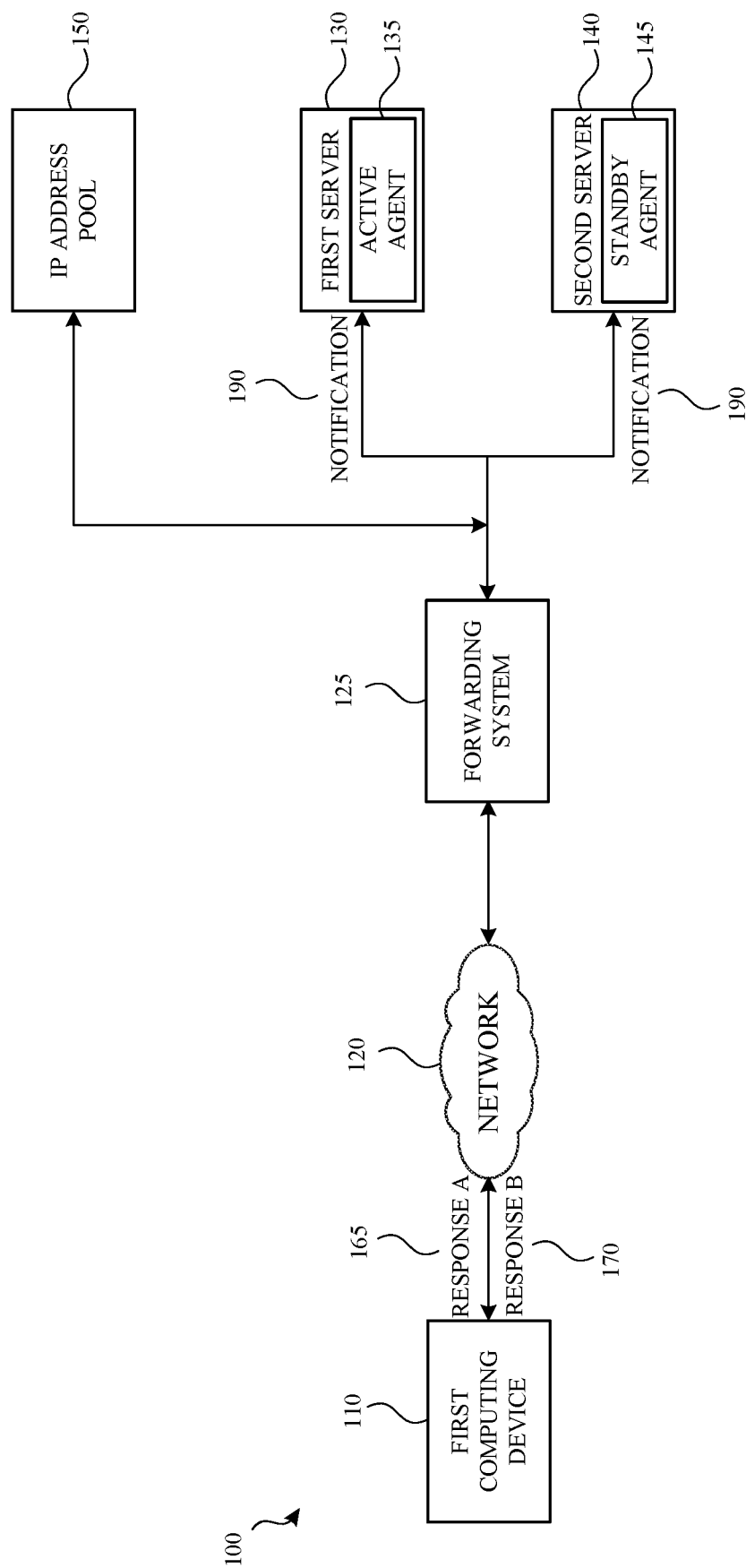
FIG. 1C illustrates a response from each server in the server cluster being provided to the computing device according to an example.

Returning to the example above and referencing FIG. 1C, based on receiving the first request 115 (e.g., the "Discovery" broadcast in the DHCP DORA process), each of the first server 130 and the second server 140 submit an offer (e.g., the "Offer" in the DHCP DORA process) to the first computing device 110. The offer from each server contains an IP address from its respective micro-pool.

For example, in response to receiving the first request 115, the first server 130 provides Response A 165 to the first computing device 110 via the network 120. Response A 165 includes one of the available IP addresses in the first micro-pool 155 (e.g., IP address 192.0.2.0 (310) from the first micro-pool 305). Likewise, in response to receiving the first request 115, the second server 140 provides Response B 170 to the first computing device 110 via the network 120. Response B 170 includes one of the available IP addresses in the second micro-pool 160 (e.g., IP address 192.0.2.6 (345) from the second micro-pool 330).

A server may issue any available IP address in its micro-pool in any order. For example, the first server 130 may issue IP address 192.0.2.0 (310) first, followed by IP address 192.0.2.2 (320), followed by IP address 192.0.2.1 (315) and IP address 192.0.2.3 (325).

Based on receiving Response A 165 and Response B 170, the first computing device 110 selects one of the offered IP addresses. The first computing device 110 provides a notification 190 (e.g., the "Request" in the DHCP DORA process) to each of the first server 130 and the second server 140. The notification 190 indicates whether the first computing device 110 accepted the IP address contained in Response A 165 or the IP address contained in Response B 170. The active agent 135 tracks the various responses provided to the first computing device 110 (and other computing devices that access the system 100) as well as the various notifications that are received by the first server 130 and the second server 140. This information may be tracked or otherwise stored in an IP address lease database or other storage system.

In this example, the first computing device 110 accepted the IP address contained in Response A 165 (e.g., IP address 192.0.2.0 (310)). Upon receiving the notification 190, the first server 130 sends an acknowledgement (e.g., the "Acknowledge" in the DHCP DORA process) to the first computing device 110, and the second server 140 will withdraw or otherwise reclaim the offered IP address. The active agent 135 may also use the notification 190 to update and/or maintain the IP address lease database with available IP addresses in each of the first micro-pool 155 and the second micro-pool 160.

For example and referring back to FIG. 3, the first micro-pool 305 now has three different available IP addresses—192.0.2.1 (315), 192.0.2.2 (320) and 192.0.2.3 (325). The second micro-pool 330 has four available IP addresses—192.0.2.4 (335), 192.0.2.5 (340), 192.0.2.6 (345) and 192.0.2.7 (350).

Figure 1D:
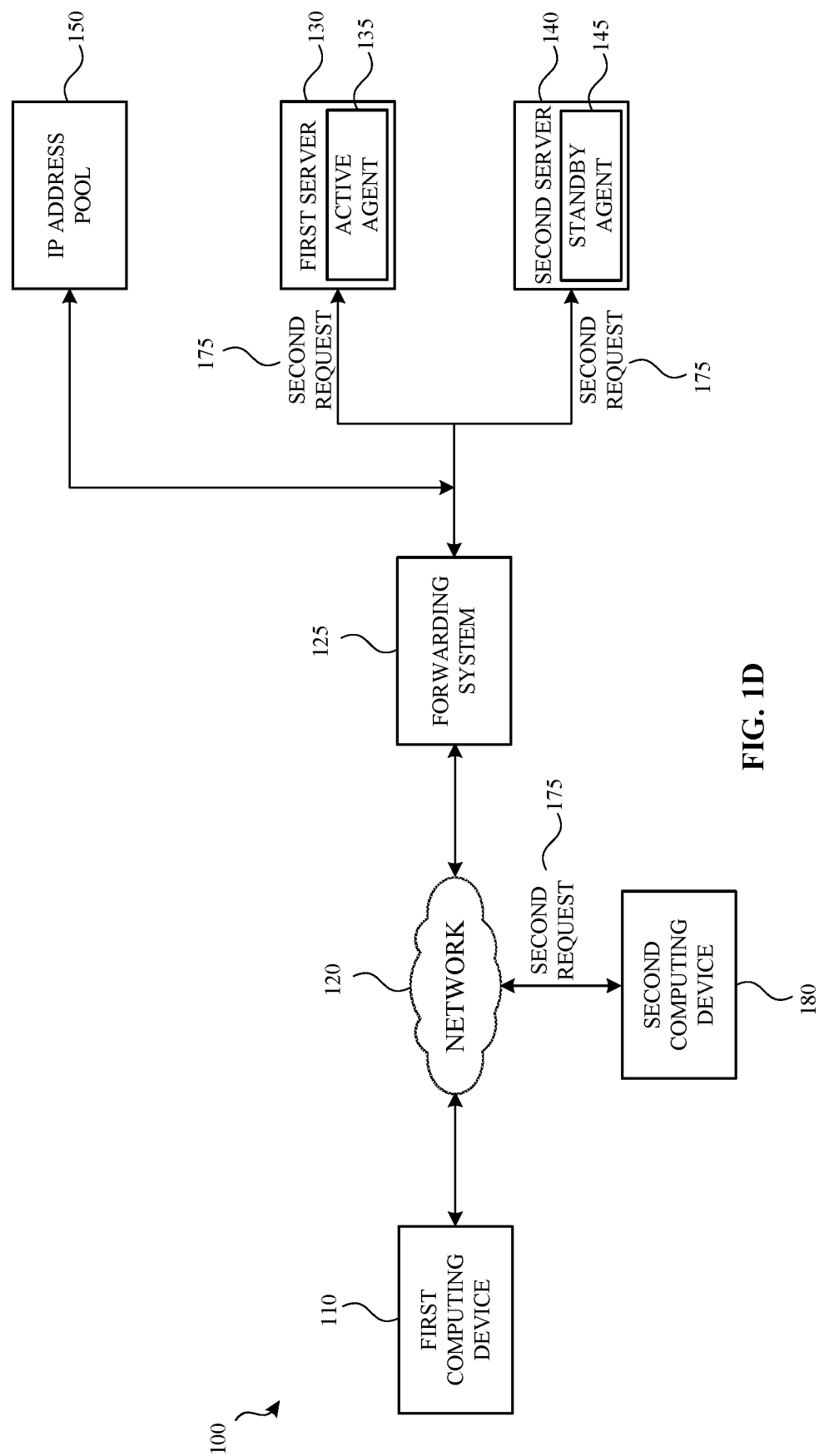
FIG. 1D illustrates the example system of FIG. 1A in which a second computing device submits an IP address request to the servers in the server cluster according to an example.

In FIG. 1D, a second computing device 180 is added to the system 100. The second computing device 180 initiates a discovery process by submitting a second request 175, via the network 120, to the forwarding system 125. Based on receiving the second request 175, the forwarding system 125 converts the second request 175 from a first format to a second format and provides the second request 175 to the first server 130 and the second server 140. As with the first request 115 (FIG. 1A), the second request 175 is a request for an IP address.

When the first server 130 and the second server 140 receive the second request 175, the first server 130 and the second server 140 analyze their respective micro-pools to determine which IP address will be offered to the second computing device 180. The first server 130 and the second server 140 will generate and submit a response to the second computing device 180.

Figure 1E:
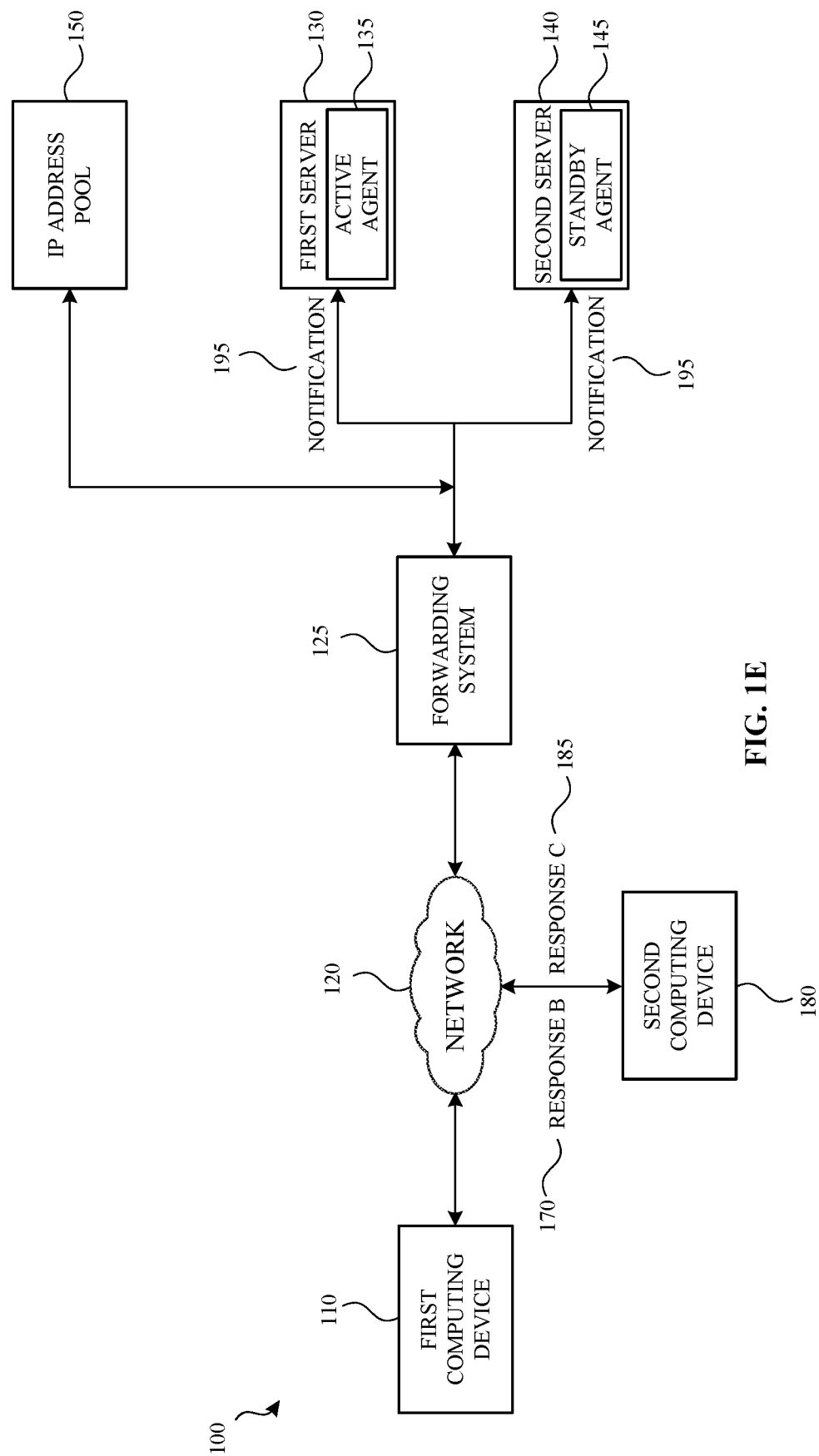
FIG. 1E illustrates a response from each server in the server cluster being provided to the second computing device according to an example.

For example and referring to FIG. 1E, in response to receiving the second request 175, the first server 130 analyzes the first micro-pool 305 and determines that the following IP addresses are still available: 192.0.2.1 (315), 192.0.2.2 (320) and 192.0.2.3 (325). Likewise, the second server 140 determines that the second micro-pool 330 has four available IP addresses: 192.0.2.4 (335), 192.0.2.5 (340), 192.0.2.6 (345) and 192.0.2.7 (350).

The first server 130 generates an offer (shown as Response C 185) that includes the IP address 192.0.2.1 (315) and the offer is provided to the second computing device 180. Likewise, the second server 140 generates an offer (shown as Response B 170) that includes the IP address 192.0.2.6 (345). Although this example has the second server 140 providing the same IP address in its response to the first computing device 110 and the second computing device 180 (e.g., IP address 192.0.2.6 (345)), each response from the second server 140 may include any available address from the second micro-pool 330.

When Response C 185 and Response B 170 are received by the second computing device 180, the second computing device 180 accepts one of the responses. In this example, the second computing device 180 accepts the IP address 192.0.2.1 (315) from Response C 185. The second computing device 180 generates or otherwise provides a notification 195 to the first server 130 and the second server 140 indicating which offer was accepted and which offer was rejected. Since the offer from the second server 140 was rejected, the IP address 192.0.2.6 (345) is still available in the second micro-pool 330. The active agent 135 may update the IP address lease database as previously described using information contained in the notification 195.

Figure 1F:
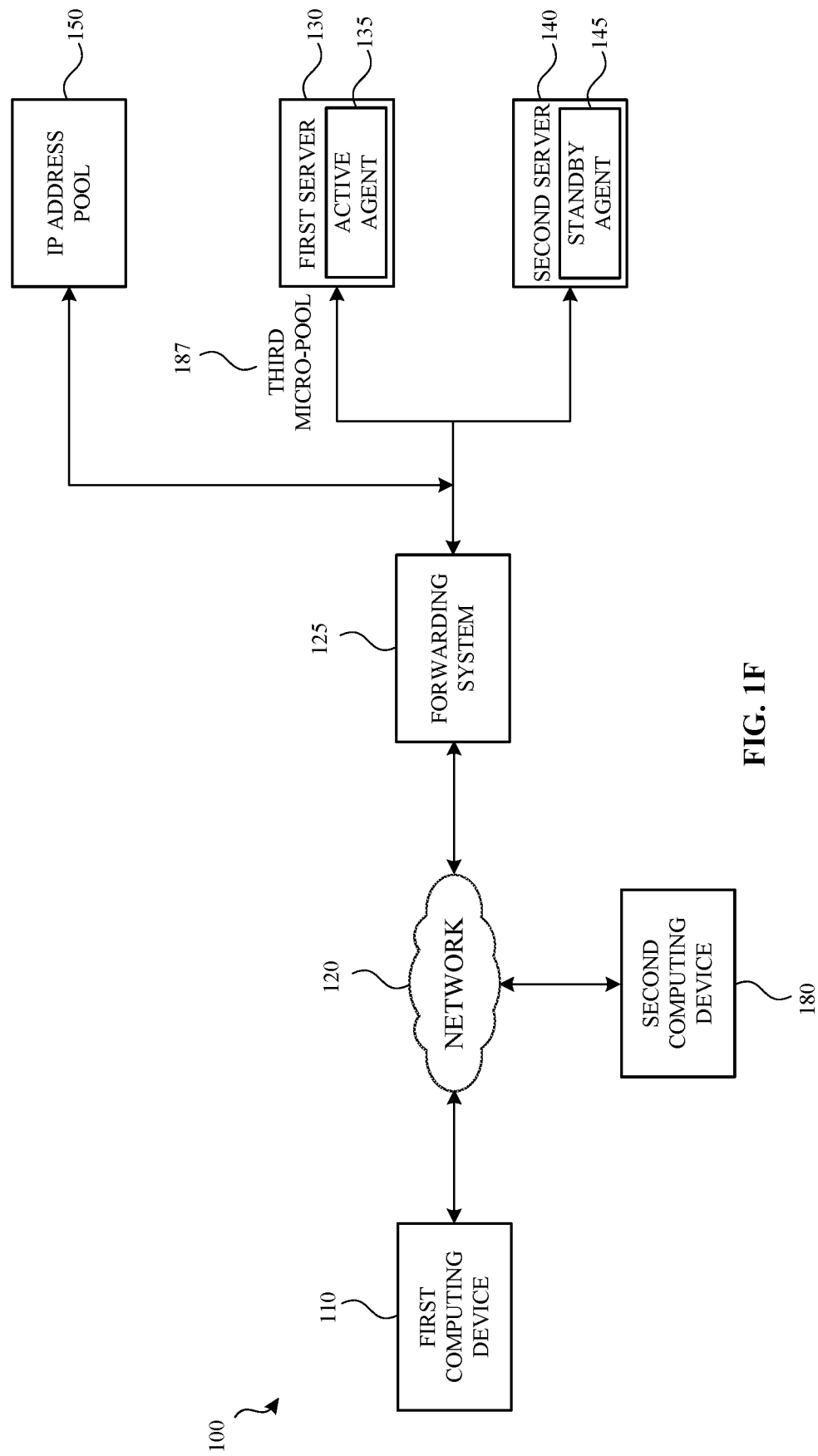
FIG. 1F illustrates the agent assigning another micro-pool of IP addresses to one server in the server cluster according to an example.

In an example, when a certain number of IP addresses in a particular micro-pool have been assigned or are otherwise unavailable, an additional micro-pool may be provided to or otherwise assigned to the particular server. For example, the first server 130 has now leased two of the four available IP addresses in the first micro-pool 305. Accordingly, and as shown in FIG. 1F, a third micro-pool 187 is provided to the first server 130. As shown in FIG. 3, the third micro-pool 360 includes the following IP addresses: 192.0.2.8 (360), 192.0.2.9 (365), 192.0.2.10 (370), and 192.0.2.11 (375).

In an example, a new micro-pool will be assigned or otherwise provided to a particular server when half of the available IP addresses in the micro-pool have been assigned. In another example, any threshold number of IP addresses being assigned from a particular micro-pool may trigger an assignment of, and/or a request for, an additional micro-pool.

In one example, a server may request a new micro-pool once the threshold number of IP addresses in the micro-pool has been assigned. In another example, the active agent 135 may detect or otherwise determine that the server should be assigned a new micro-pool based on an amount of remaining IP addresses in the micro-pool that is currently assigned to the server.

The active agent 135 may also track the number of micro-pools that have been assigned to each server. Accordingly, the active agent 135 may balance the load across the first server 130 and the second server 140. For example, when a computing device (e.g., the second computing device 180) receives an offer from multiple servers, the computing device will accept the first offer that is received. Thus, if offers from the first server 130 are continually received first by various computing devices, the first server 130 may eventually become overloaded.

Accordingly, the active agent 135 may take various actions to ensure load imbalances are prevented, detected, and/or rectified. For example, if the active agent 135 determines that a particular server is receiving or requesting more micro-pools than another server in the server cluster, the active agent 135 may stop (at least temporarily) assigning new micro-pools to that server.

In another example, the active agent 135 may cause a particular server to ignore IP address requests which may help ensure that an offer made by another server is accepted by the requesting computing device. In yet another example, the active agent 135 may allow the particular server to issue an offer when an IP address request is received but instruct the particular server to provide the offer only after a time period has expired (e.g., the active agent 135 causes a delay in any response issued by the particular server).

In an example, these actions may occur when an overload condition is detected or anticipated (e.g., based on tracked or detected responses and/or notifications). In another example, these actions may occur based on an occurrence of an event (e.g., a server coming online after having crashed, a new server being added to a cluster). In another example, these actions may occur in real-time or substantially real-time based on which servers are receiving or requesting new micro-pools. For example, if the first server 130 receives an additional micro-pool, the active agent 135 may cause the first server 130 to issued delayed responses until the second server 140 receives another micro-pool.

As IP addresses from micro-pools are assigned to various client devices, the IP addresses in the various micro-pools may be combined. Continuing with the example above and with reference to FIG. 1F and FIG. 3, when the first server 130 is assigned the third micro-pool 187, the first server 130 has access to six different IP addresses. For example, the first server 130 has access to IP addresses 192.0.2.2 (320) and 192.0.2.3 (325) from the first micro-pool 305 and to IP addresses 192.0.2.8 (360), 192.0.2.9 (365), 192.0.2.10 (370), and 192.0.2.11 (375) from the third micro-pool 380.

As new computing devices are added to the system 100, the first server 130 may eventually assign IP addresses 192.0.2.9 (365) and 192.0.2.10 (370) from the third micro-pool 380 to the new computing devices. The first server 130 still has access to IP addresses 192.0.2.2 (320) and 192.0.2.3 (325) from the first micro-pool 305 and to IP addresses 192.0.2.8 (360) and 192.0.2.11 (375) from the third micro-pool 355.

In this example, the first server 130 (or the active agent 135) may combine the IP addresses from the first micro-pool 305 with the IP addresses from the third micro-pool 355 to create a combined micro-pool 380. For example and as shown in FIG. 3, the combined micro-pool 380 may consist of IP addresses 192.0.2.2 (320), 192.0.2.3 (325), 192.0.2.8 (360) and 192.0.2.11 (375). The first server 130 may issue IP addresses out of the combined micro-pool 380 in a similar manner as described with respect to the first micro-pool 305. An empty-micro-pool (either the first micro-pool 305 or the third micro-pool 355) may be returned to the active agent 135 and/or the IP address pool 150.

In the system 100, renewal requests may be handled by the server that initially issued the IP address. For example, since the first server 130 issued the IP address to the first computing device 110, the first server 130 would subsequently handle any IP address renewal requests from the first computing device 110. However, there may be a time when one server in the server cluster crashes or is temporarily unavailable. Accordingly, FIG. 2A illustrates how renewal requests and IP address requests are handled when a server in the server cluster is not available according to an example.

Figure 2A:
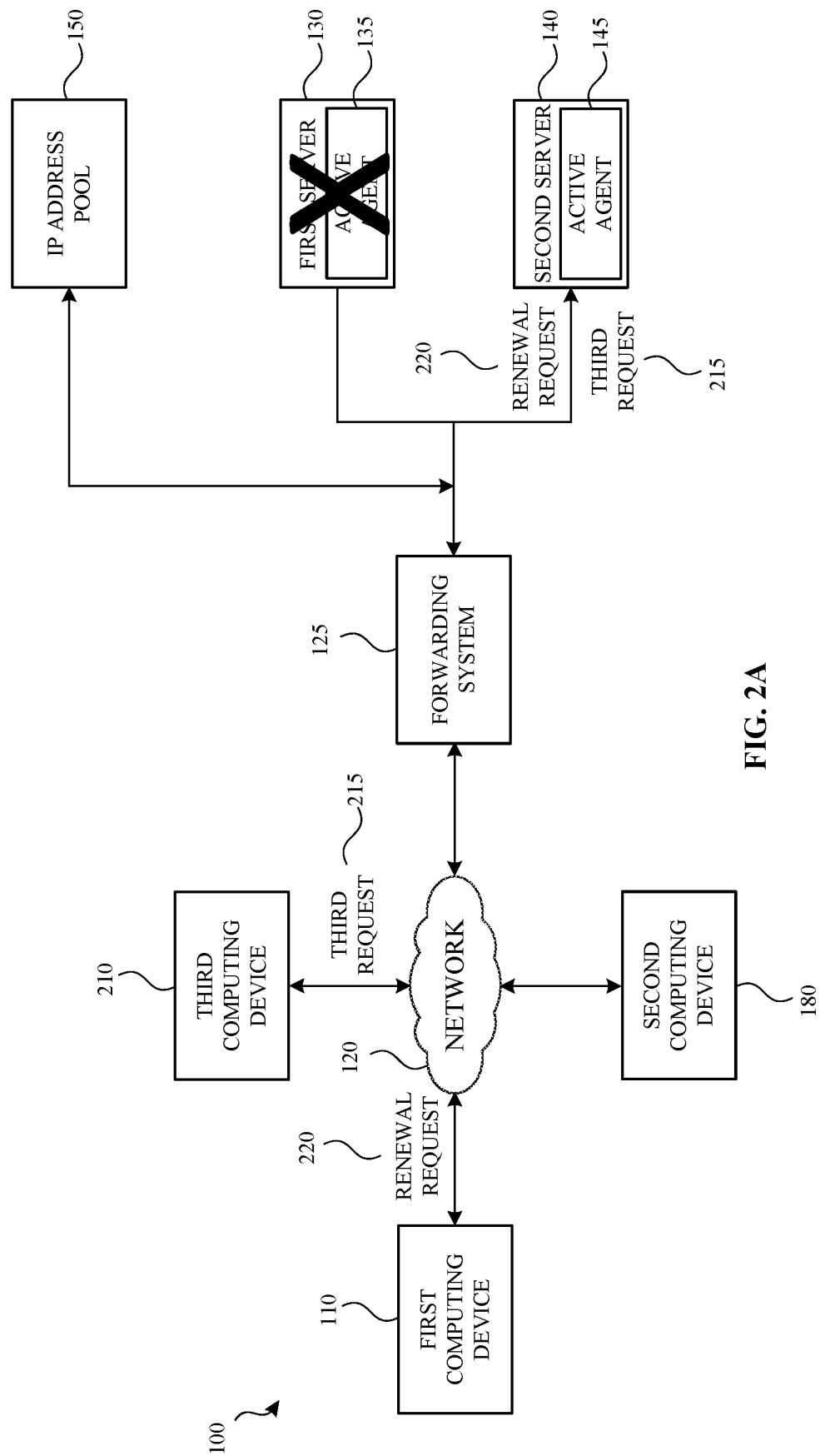
FIG. 2A illustrates how renewal requests and IP address requests are handled when a server in the server cluster is not available according to an example.
Figure 2B:
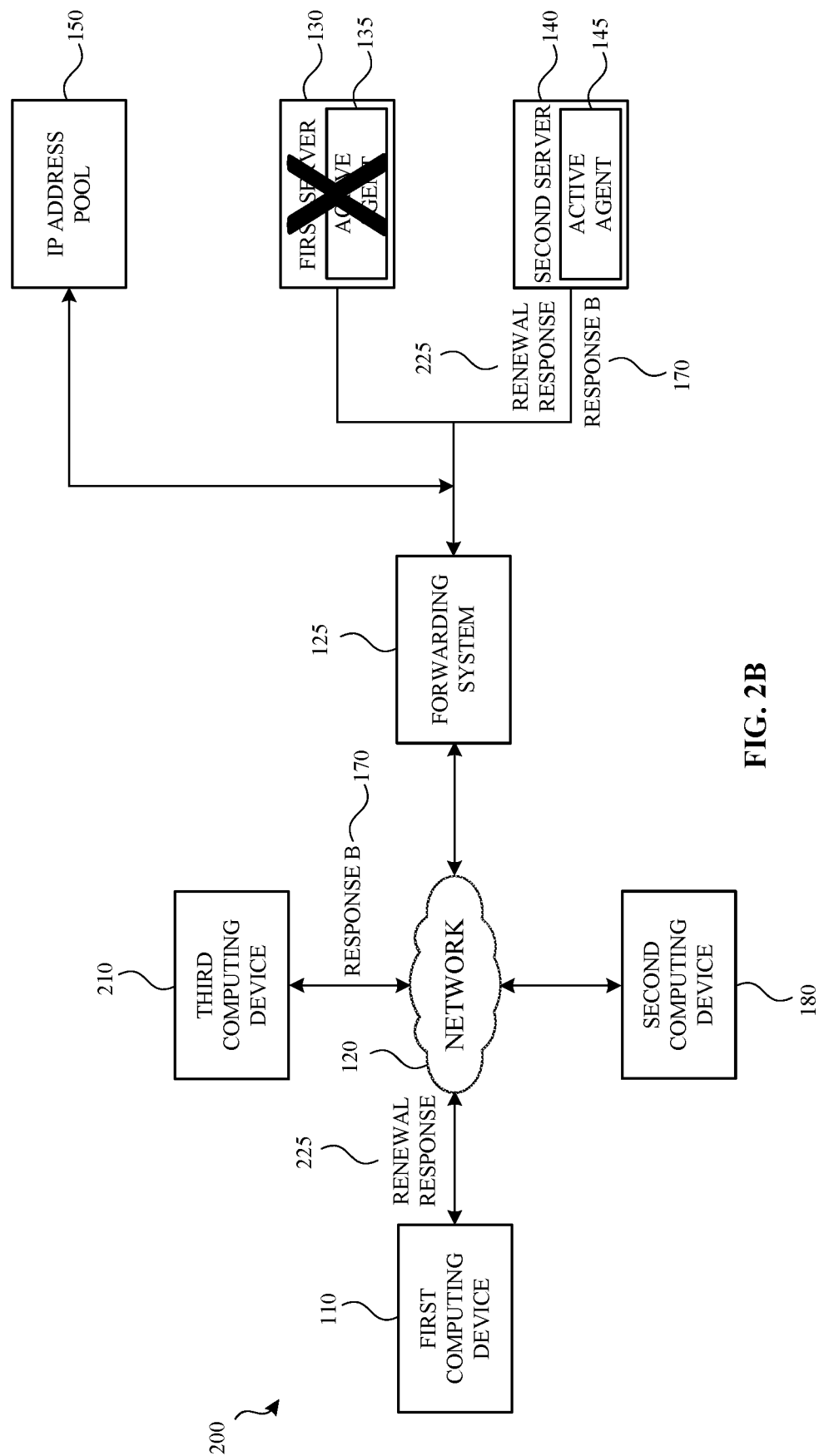
FIG. 2B illustrates a server in the server cluster responding to received renewal requests and IP address requests according to an example.

In the example shown in FIG. 2B, the first server 130 is temporarily unavailable (represented by the X overlayed on the first server 130). During this time, a third computing device 210 may access the system 100 and provide a third request 215 to the forwarding system 125 via the network 120 as part of an initial discovery process. The forwarding system 125 may provide the third request 215 to the first server 130 and the second server 140. However, since the first server 130 is down, only the second server 140 will provide an offer to the third computing device 210 (shown as Response B 170 (FIG. 2B)). As described above, Response B 170 may include any available IP address from the second micro-pool 330.

Additionally, and as shown in FIG. 2A, since the first server 130 is inoperable, the active agent 135 may also be unavailable. In such an example, standby agent 145 (FIG. 1A-FIG. 1F) will assume the role of the active agent (represented in FIG. 2A as the active agent 145). The active agent 145 will handle all subsequent micro-pool assignments such as described above. The active agent 145 associated with the second server 140 may be the active agent until the agent associated with the first server 130 is back online. At that point, the agent associated with the first server 130 may resume its original role. In another example, the agent associated with the second server 140 may continue its role as the active agent while the agent associated with the first server 130 assumes the role of a standby agent.

While the first server 130 is inoperable, the first computing device 110 may issue a renewal request 220 in order to renew its lease on IP address 192.0.2.0 (310). If the first server 30 was operable, the first server 130 would handle the renewal request 220. However, in this example, the first server 130 is unable to handle the renewal request 220. Accordingly, the second server 140, via the active agent 145, may respond to the renewal request 220 by issuing a renewal response 225 (FIG. 2B). The active agent 145 is able to issue the renewal response 225 on behalf of the first server 130 because all agents of the system 100 (either active agents or standby agents) have access to the IP address lease database that includes a record of the various micro-pools, IP address leases, responsible servers, etc. In examples, the IP address lease database is stored with the IP address pool, which may be maintained, in examples, on a separate device 150, which may have its own backup (not shown). As such, the risk of assigning the same IP address to different computing devices is minimal or is otherwise eliminated.

In another example, the active agent 145 may not immediately respond to the renewal request 220. For example, after a period of time has elapsed and if the first computing device 110 does not receive a renewal response 225, the first computing device 110 will issue another request for an IP address. This request may be received by the second server 140. Based on receiving this new request, the second server 140 issues an IP address from the second micro-pool 330 (e.g., IP address 192.0.2.5 (340)) to the first computing device 110.

The active agent 145 (or the first server 130) reclaims the non-renewed IP address (e.g., IP address 192.0.2.0 (310)) to a micro-pool associated with the first server 130. In another example, IP address 192.0.2.0 (310)) may be added to the IP address pool 150 to await assignment to another micro-pool. For example, after a certain number (e.g., four) of leases on various IP addresses have expired or the IP addresses have otherwise been reclaimed, the active agent 145 may create a new micro-pool that contains the reclaimed IP addresses. That new micro-pool may be assigned to various servers such as with other micro-pools previously described.

The active agent 145 may also have the ability to revoke an IP address in a particular micro-pool and/or to revoke an entire micro-pool from a particular server. For example, if the first server 130 is inoperable for over a threshold amount of time (e.g., thirty minutes), the active agent 145 may revoke the combined micro-pool 380 and its associated IP addresses from the first server 130. When the first server 130 is back online, the first server 130 may request or otherwise receive another micro-pool (or the combined micro-pool 380) from the active agent 145.

Although a specific example has been given with respect to a revocation of a micro-pool, the active agent 145 may revoke a micro-pool from a particular server for any number of reasons. Some examples include, but are not limited to, as part of a load-balancing effort, in response to a new server being added to the system 100, in response to the server not responding to requests in a timely manner, in response to a combination of two or more micro-pools, in response to a revocation of a particular IP address in the micro-pool etc.

Figure 4:
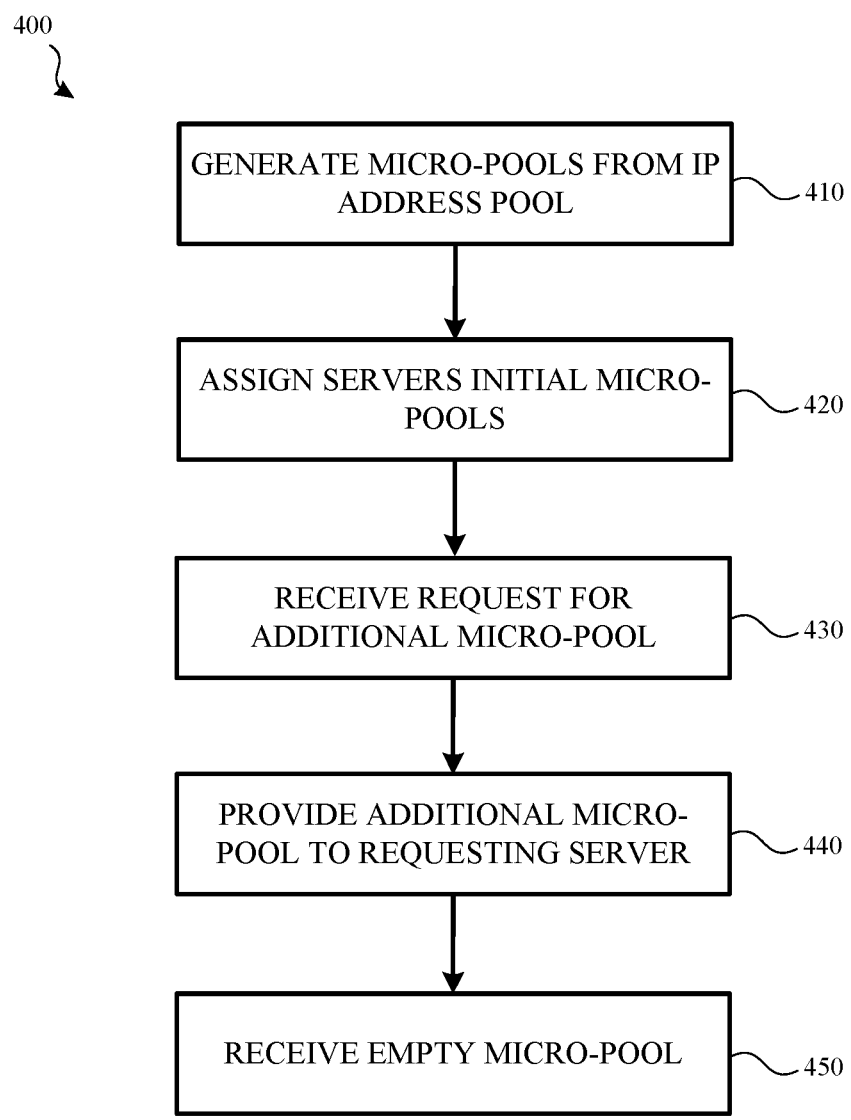
FIG. 4 illustrates a method for assigning a micro-pool to a server in a server cluster according to an example.

FIG. 4 illustrates a method 400 for assigning micro-pools to a server in a server cluster according to an example. The method 400 may be performed by an active agent such as, for example, active agent 135 and/or active agent 145 (FIG. 1A-FIG. 2B).

Method 400 begins when the active agent generates (410) one or more micro-pools. The one or more micro-pools are generated based on IP addresses in an IP address pool. In an example, some or all of the available micro-pools may be generated at the same time or substantially the same time. For example, if the IP address pool contains two-hundred and fifty-six IP addresses, the active agent may generate sixty-four micro-pools with each micro-pool having four IP addresses. In another example, the active agent may generate each micro-pool in response to an event. For example, the active agent may generate a micro-pool in response to receiving a request for a micro-pool from a server in the server cluster. Thus, micro-pools are created as needed.

The active agent may assign (420) each server in the server cluster an initial micro-pool. The assignment may be made by the active agent alone. In another example, each server in the server cluster may negotiate with the active agent in order to receive a micro-pool.

As various requests are received by the servers in the server cluster, a server may have need of an additional micro-pool. Accordingly, the active agent may receive (430) a request for an additional micro-pool.

In response to receiving the request, the active agent provides (440) the additional micro-pool to the requesting server. Although a specific request is shown and described, the active agent may provide the additional micro-pool to the server without receiving a request. For example, the active agent may assign the server an additional micro-pool in response to detecting that the server has issued two out of the four available IP addresses in its current micro-pool.

The active agent may also receive (450) an empty micro-pool from the server. The receipt of the empty micro-pool may indicate that an additional micro-pool may be provided to the server. In another example, the empty micro-pool may be received because the active agent (or the server) caused IP addresses in two separate micro-pools to be combined.

The active agent may populate the empty micro-pool with IP addresses that have been reclaimed (e.g., due to a lease expiring and/or due to an IP address reclamation process executed by the active agent). The newly populated micro-pool may then be assigned to a server such as previously described.

Figure 5:
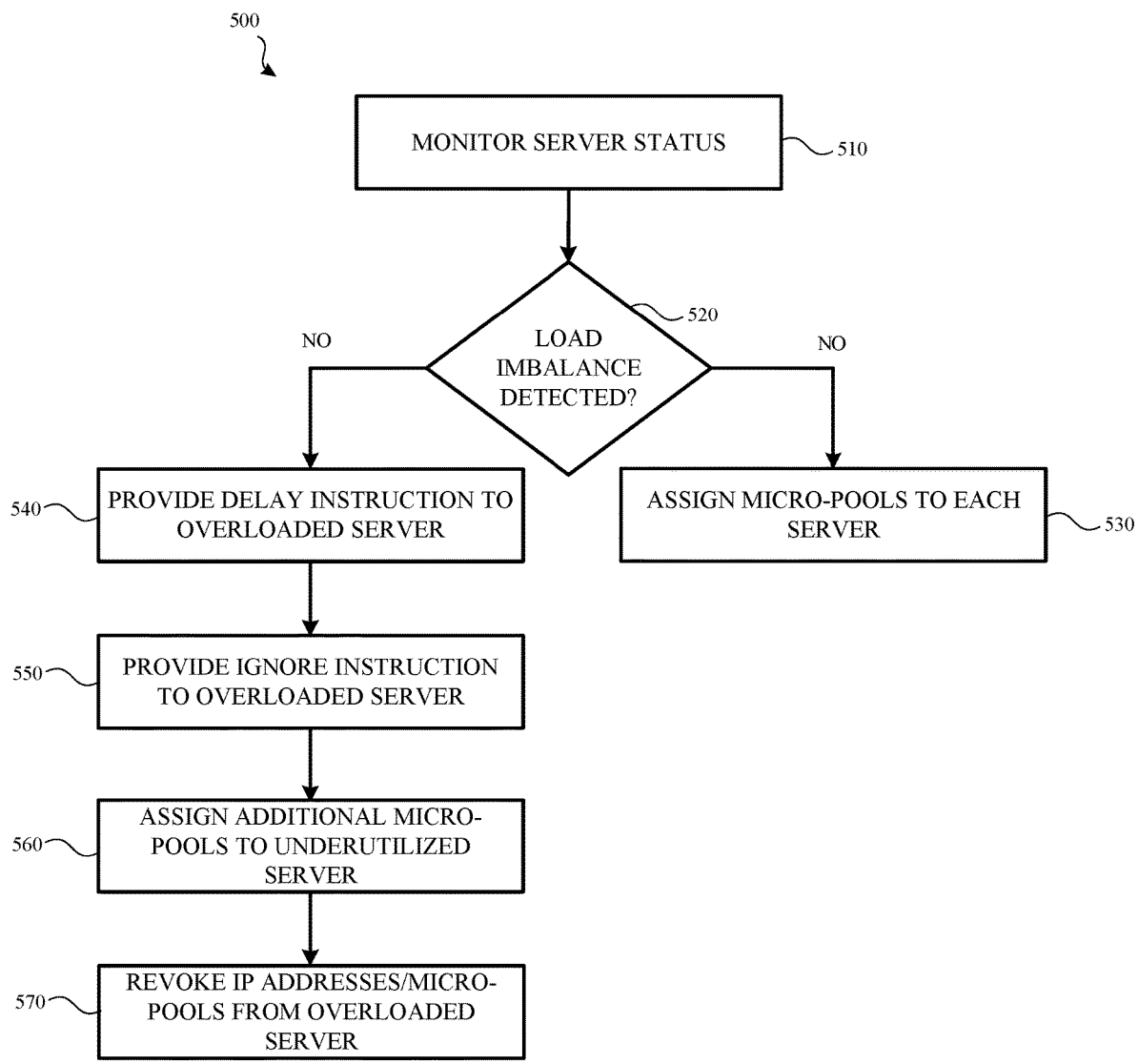
FIG. 5 illustrates a method for load balancing servers in a server cluster according to an example.

FIG. 5 illustrates a method 500 for load balancing servers in a server cluster according to an example. The method 500 may be performed by an active agent such as, for example, active agent 135 and/or active agent 145 (FIG. 1A-FIG. 2B).

Method 500 begins when an active agent monitors (510) the status of each server in the server cluster. The monitoring may consist of tracking and/or updating an IP address lease database and/or monitoring in real-time or substantially real-time an operating state of the servers. The IP address lease database may indicate which micro-pools are assigned to each server, the IP addresses that are assigned by the server, the amount of IP addresses remaining in a given micro-pool and the like. The operating state of the server may include a response time of a server (e.g., an amount of time it takes for the server to respond to a IP address request and/or a renewal request), an amount of requests being handled by the server, a number of times the server has requested and/or received another micro-pool, whether the server has crashed and subsequently comes back online, etc.

Based on the monitoring process, the active agent determines (520) whether a load imbalance exists. If it is determined that a load imbalance does not exist, the active agent may subsequently assign (530) additional micro-pool(s) to each server. The additional micro-pool may be assigned to each server based on a received request. In another example, the additional micro-pool may be assigned to each server as part of the monitoring operation (510) described above.

However, if the active agent detects (520) a load imbalance, the active agent may execute a number of different operations or processes. Although FIG. 5 shows each of the following operations in sequence, these operations may occur simultaneously, substantially simultaneously or serially. In another example, any of the following processes may be used alone or in combination.

For example, in response to a load imbalance being detected, the active agent may provide (540) delay instructions to an overloaded server. The delay instruction may cause the server to delay responding to initial IP address requests and/or renewal requests from various computing devices. The delay may enable another server to respond to the initial IP address request and/or to issue an IP address to a requesting computing device if the lease on the computing device's current IP address is not renewed by the originally issuing server.

In another example the active agent may provide (550) ignore instructions to the overloaded server when a load imbalance is detected. The ignore instruction may cause the server to ignore any and all IP address requests and/or renewal requests from various computing devices. As such, another server may respond to the initial IP address request and/or issue another IP address to the requesting computing device when/if the lease on the computing device's current IP address is not renewed by the originally issuing server due.

In yet another example, the active agent may assign (560) additional micro-pools to underutilized servers while refusing to issue additional micro-pools to the overloaded server. For example, when the overloaded server requests another micro-pool, the active agent may deny or otherwise ignore the request.

In another example, the active agent may revoke one or more IP addresses and/or micro-pools from the overloaded server and subsequently assign the IP addresses and/or the micro-pools to a different server.

Each of the processes described above may occur for as long as the load imbalance is detected. In another example, these operations may be executed for a predetermined amount of time and/or until a predetermined number of micro-pools have been assigned to underutilized servers.

Figure 6:
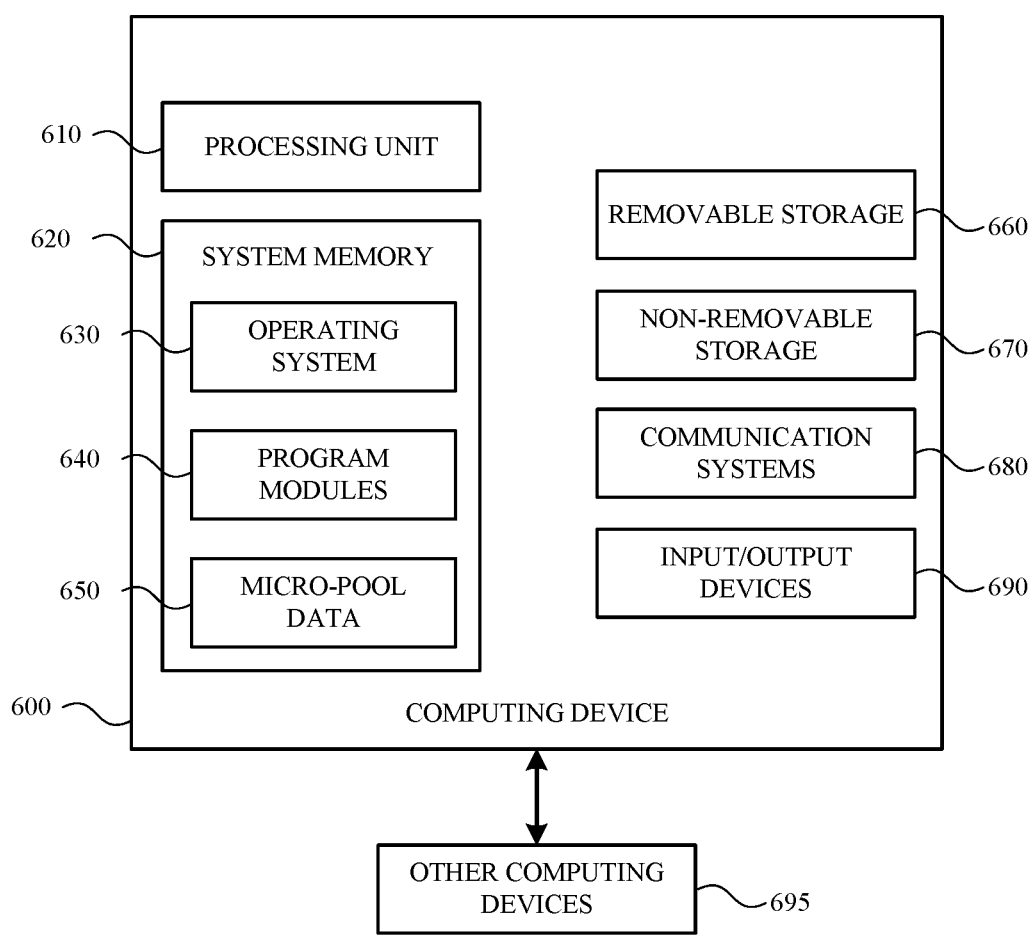
FIG. 6 is a block diagram of a computing device according to an example.

FIG. 6 is a system diagram of a computing device 600 according to an example. The computing device 600, or various components and systems of the computing device 600, may be integrated or associated with an active agent, a standby agent, a server, a forwarding system or a computing device shown and described herein. As shown in FIG. 6, the physical components (e.g., hardware) of the computing device are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640. The program modules 640 may be responsible for storing micro-pool data 650 including, but not limited to, generating micro-pools, assigning micro-pools, and revoking micro-pools such as described above. A number of different program modules and data files may be stored in the system memory 620. While executing on the processing unit 610, the program modules 640 may perform the various processes described above.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695 such as, for example, routing engines, gateways, signings systems and the like. Examples of communication systems 680 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 600 may also have one or more input devices and/or one or more output devices shown as input/output devices 690. These input/output devices 690 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
generating a first micro-pool and a second micro-pool from a pool of internet protocol (IP) addresses, the first micro-pool having a first set of IP addresses from the pool of IP addresses and the second micro-pool having a second set of IP addresses from the pool of IP addresses;
assigning the first micro-pool to a first server;
assigning the second micro-pool to a second server;
monitoring a request from a computing device, the request including a request for an IP address and causing the first server to respond with a first IP address from the first set of IP addresses in the first micro-pool and causing the second server to respond with a second IP address from the second set of IP addresses in the second micro-pool;
updating a status of one of the first micro-pool or the second micro-pool based, at least in part, on the computing device selecting either the first IP address or the second IP address; and
receiving an indication that identifies the first micro-pool as an empty micro-pool from the first server after a remaining portion of the first set of IP addresses in the first micro-pool have been combined with IP addresses in another micro-pool assigned to the first server.

2. The method of claim 1, further comprising assigning the first server another micro-pool in response to a micro-pool request being received from the first server.

3. The method of claim 2, wherein the another micro-pool includes another set of IP addresses from the pool of IP addresses.

4. The method of claim 1, further comprising assigning the first server another micro-pool based, at least in part, on a monitored status of the first micro-pool.

5. The method of claim 4, wherein the monitored status is a number of available IP addresses remaining in the first micro-pool.

6. The method of claim 4, wherein the another micro-pool includes another set of IP addresses from the pool of IP addresses.

7. The method of claim 1, further comprising causing the first server to delay responding to the request from the computing device based, at least in part, on an overload condition being detected.

8. The method of claim 1, further comprising causing the first server to ignore the request from the computing device based, at least in part, on an overload condition being detected.

9. A system, comprising:
a processor; and
a memory communicatively coupled to the processor and storing instructions that, when executed by the processor, perform operations, comprising:
assigning a first micro-pool to a first server and a second micro-pool to a second server, the first micro-pool having a first set of internet protocol (IP) addresses from a pool of IP addresses and the second micro-pool having a second set of IP addresses from a general pool of IP addresses;
monitoring a status of the first micro-pool and the second micro-pool;
assigning the first server another micro-pool based, at least in part, on the monitored status of the first micro-pool; and
receiving an indication that identifies the first micro-pool as an empty micro-pool from the first server after a remaining portion of the first set of IP addresses in the first micro-pool have been combined with IP addresses in another micro-pool assigned to the first server.

10. The system of claim 9, wherein the another micro-pool includes another set of IP addresses from the pool of IP addresses.

11. The system of claim 9, wherein the monitored status is a number of available IP addresses remaining in the first micro-pool.

12. The system of claim 9, further comprising instructions for causing the first server to delay responding to a request from a computing device based, at least in part, on an overload condition being detected.

13. The system of claim 9, further comprising causing the first server to ignore a request from a computing device based, at least in part, on an overload condition being detected.

* * * * *